(12) United States Patent
Watanabe et al.

(10) Patent No.: US 6,510,028 B1
(45) Date of Patent: Jan. 21, 2003

(54) MAGNETIC HEAD MOVING MOTOR AND MAGNETIC RECORDING APPARATUS

(75) Inventors: Hitoshi Watanabe, Tokyo (JP); Hiroshi Nishizawa, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 47 days.

(21) Appl. No.: 09/784,066

(22) Filed: Feb. 16, 2001

(30) Foreign Application Priority Data

Feb. 29, 2000 (JP) ........................................ 2000-054304

(51) Int. Cl.⁷ .................................................. G11B 5/55
(52) U.S. Cl. .................................................... 360/266.8
(58) Field of Search ............................ 360/266.5–266.9

(56) References Cited

U.S. PATENT DOCUMENTS

| | | | |
|---|---|---|---|
| 5,130,972 A | * | 7/1992 | Mizuno .................... 360/266.6 |
| 5,650,891 A | | 7/1997 | Thayne et al. |
| 5,731,933 A | | 3/1998 | Sonderegger et al. |
| 6,442,003 B1 | * | 8/2002 | Jones ...................... 360/266.7 |

* cited by examiner

*Primary Examiner*—A. J. Heinz
(74) *Attorney, Agent, or Firm*—McDermott, Will & Emery (57) ABSTRACT

A motor for moving a magnetic head includes a carriage. A suspension supports the magnetic head, and is connected to the carriage. A coil is fixed to the carriage. A guide rod is centered at the coil. A magnet arrangement consists of only two magnets located at positions opposed diagonally with respect to the guide rod.

10 Claims, 7 Drawing Sheets

RECORDING MEDIUM
MOVEMENT DIRECTION

FIG. 10

MAGNETIC HEAD MOVING MOTOR AND MAGNETIC RECORDING APPARATUS

BACKGROUND OF THE INVENTION

1. Field of the Invention

This invention relates to a magnetic-head moving motor. This invention also relates to a magnetic recording apparatus.

2. Description of the Related Art

A typical magnetic recording apparatus includes a magnetic head for recording a signal on a magnetic disk, and a motor for moving the magnetic head relative to the magnetic disk. The magnetic-head moving motor is relatively high in cost. The magnetic-head moving motor is relatively heavy.

SUMMARY OF THE INVENTION

It is a first object of this invention to provide an inexpensive magnetic-head moving motor.

It is a second object of this invention to provide a lightweight magnetic-head moving motor.

It is a third object of this invention to provide an inexpensive magnetic recording apparatus.

It is a fourth object of this invention to provide a lightweight magnetic recording apparatus.

A first aspect of this invention provides a motor for moving a magnetic head. The motor comprises a carriage; a suspension supporting the magnetic head and being connected to the carriage; a coil fixed to the carriage; a guide rod centered at the coil; and a magnet arrangement consisting of only two magnets located at positions opposed diagonally with respect to the guide rod.

A second aspect of this invention is based on the first aspect thereof, and provides a motor wherein the carriage is made of material containing aluminum.

A third aspect of this invention is based on the first aspect thereof, and provides a motor wherein the magnets are made by compression molding.

A fourth aspect of this invention is based on the third aspect thereof, and provides a motor wherein the magnets include a non-oxide and an oxidation inhibitor.

A fifth aspect of this invention provides a magnetic recording apparatus comprising a magnetic head, and a motor for moving the magnetic head. The motor comprises 1) a carriage, 2) a suspension supporting the magnetic head and being connected to the carriage, 3) a coil fixed to the carriage, 4) a guide rod centered at the coil, and 5) a magnet arrangement consisting of only two magnets located at positions opposed diagonally with respect to the guide rod.

A sixth aspect of this invention is based on the fifth aspect thereof, and provides a magnetic recording apparatus wherein the guide rod is flexible with respect to a driving force caused by the motor.

A seventh aspect of this invention is based on the fifth aspect thereof, and provides a magnetic recording apparatus wherein the coil comprises a self bonding wire.

An eighth aspect of this invention is based on the seventh aspect thereof, and provides a magnetic recording apparatus wherein the self bonding wire comprises an electrical conductor and a bonding layer made of polyurethane and provided on the electrical conductor.

A ninth aspect of this invention is based on the eighth aspect thereof, and provides a magnetic recording apparatus further comprising a UV adhesive bonding the coil and the carriage together.

A tenth aspect of this invention is based on the fifth aspect thereof, and provides a magnetic recording apparatus further comprising means for preventing the guide rod from being bent by a friction force caused between the magnetic head and a magnetic recording medium.

DETAILED DESCRIPTION OF THE INVENTION

A prior-art magnetic recording apparatus will be explained below for a better understanding of this invention.

Figure 1:
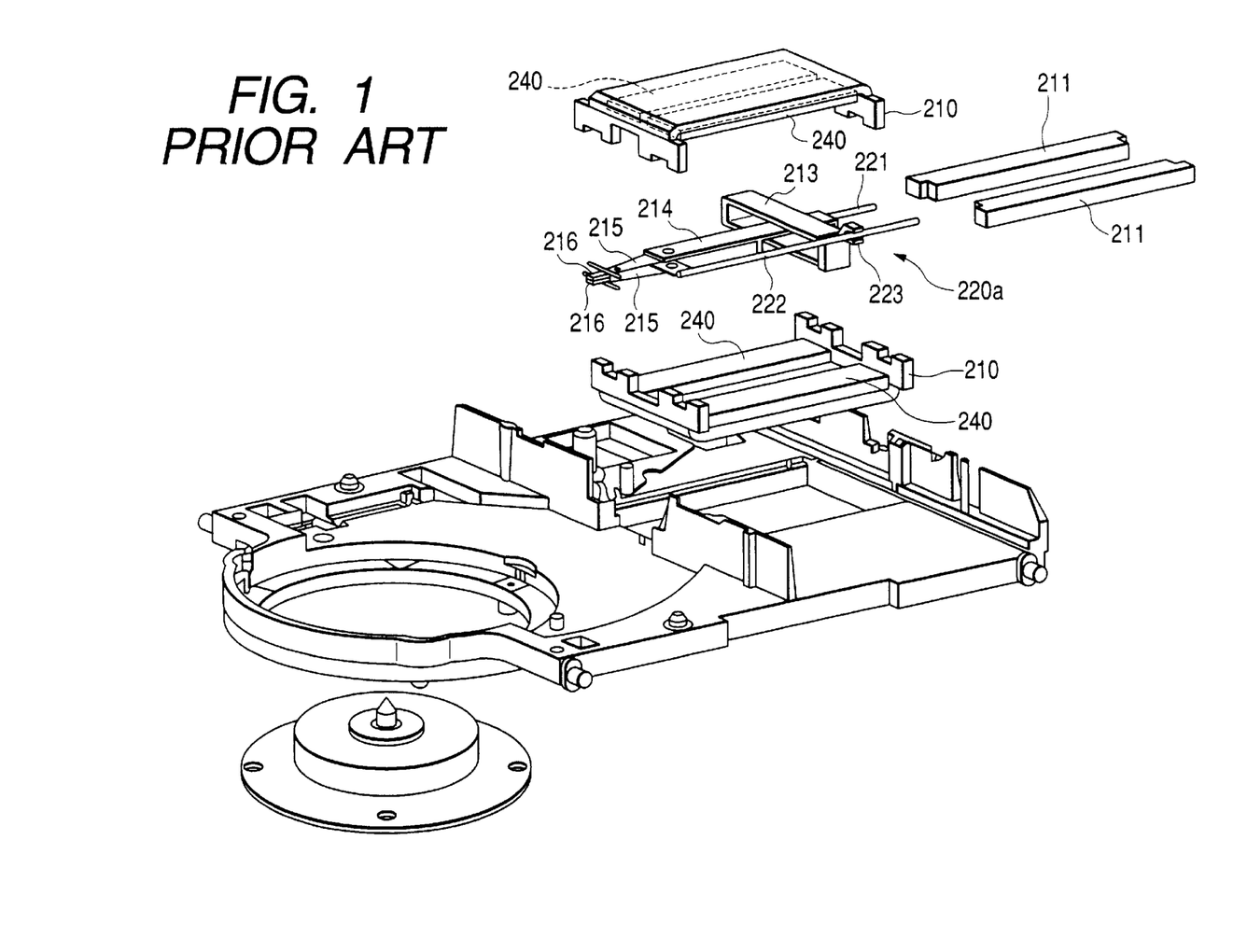
FIG. 1 is an exploded perspective view of a main portion of a prior-art magnetic recording apparatus.

With reference to FIG. 1, a prior-art magnetic recording apparatus includes a head stack assembly 220a. The head stack assembly 220a contains magnetic heads 216 and a device for moving the magnetic heads 216. The magnetic-head moving device includes a magnetic-head moving motor formed by a voice coil motor (VCM).

Figure 2:
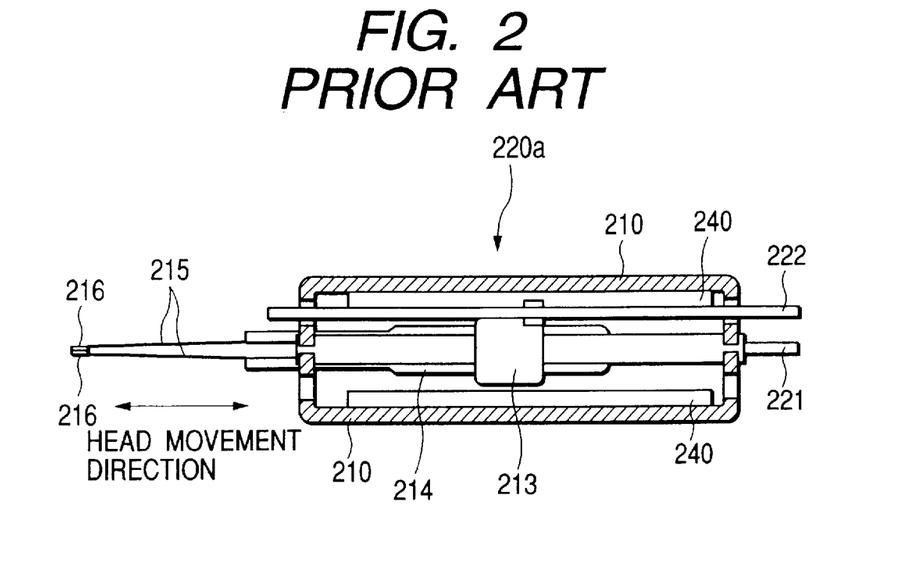
FIG. 2 is a longitudinal section view of a head stack assembly in the prior-art apparatus of FIG. 1.
Figure 3:
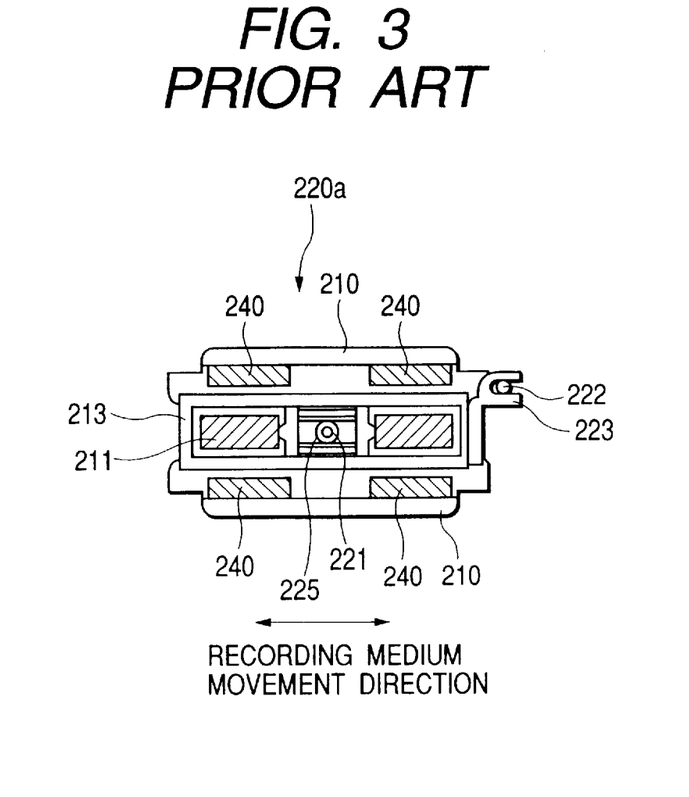
FIG. 3 is a cross-sectional view of the head stack assembly in the prior-art apparatus of FIG. 1.

As shown in FIGS. 1, 2, and 3, the voice coil motor contains a carriage 214, a VCM coil 213, outer path members 210, inner path members 211, and four magnets 240. The magnetic heads 216 are connected to the carriage 214 via suspensions 215. The VCM coil 213 is fixed to the carriage 214.

The outer path members 210 and the inner path members 211 are made of magnetic material such as iron. Each of the magnets 240 has two magnetic poles at two sides thereof. The magnets 240, the outer path members 210, and the inner path members 211 compose a magnetic circuit. Magnetic flux generated by the magnetic circuit crosses the VCM coil 213. The VCM coil 213 can be fed with a given current from a flexible printed circuit board (FPC). When being energized by the given current, the VCM coil 213 interacts with the magnets 240 to move the carriage 214 linearly. The magnetic heads 216 move together with the carriage 214. As the carriage 214 moves linearly, the magnetic heads 216 move radially with respect to a magnetic disk (a magnetic recording medium or media).

A guide rod 221 extends through the carriage 214 along the longitudinal central axis thereof. The direction of the guide rod 221 is equal to a radial direction with respect to the magnetic disk. The carriage 214 is slidably supported on the guide rod 221. Accordingly, the carriage 214 can be moved along the guide rod 221 while being guided thereby. In other words, the carriage 214 can be moved radially with respect to the magnetic disk while being guided by the guide rod 221.

A clock rod 222 extends in parallel with the guide rod 221. An outrigger 223 can be in engagement with the clock rod 222. As the carriage 214 moves linearly, the outrigger 223 travels along the clock rod 222 while limiting or inhibiting rotation of the carriage 214 about the axis of the guide rod 221.

The prior-art magnetic-head moving motor in FIGS. 1–3 has the four magnets 240. Therefore, the prior-art magnetic-head moving motor is relatively high in cost. The prior-art magnetic-head moving motor is relatively heavy.

Embodiment

Figure 4:
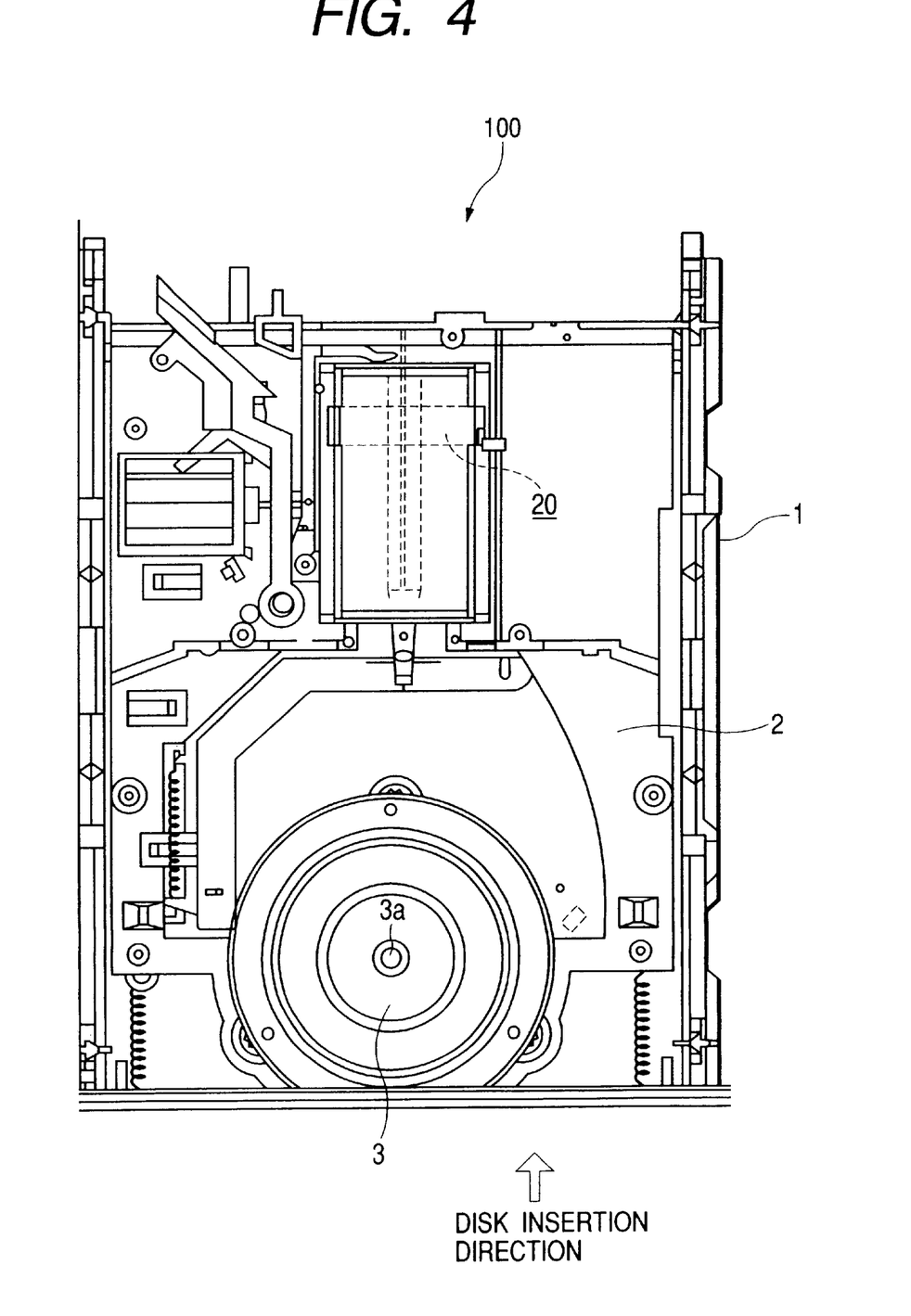
FIG. 4 is a plan view of a main portion of a magnetic recording apparatus according to an embodiment of this invention.

FIG. 4 shows a magnetic recording apparatus 100 according to an embodiment of this invention. The magnetic recording apparatus 100 is designed to operate on a floppy disk (a magnetic recording medium or media). With reference to FIG. 4, the magnetic recording apparatus 100 includes a chassis 1 on which various apparatus parts are mounted. For example, the chassis 1 is made as follows. A galvanized steel plate or an electrolytic zinc-coated plate having a thickness of 1 mm is formed into the chassis 1 by press working.

A platform 2 is supported on the chassis 1. The platform 2 is made of, for example, polycarbonate to which glass is added by about 30 wt % as reinforcing filler (strength-enhancing filler). When a floppy disk is inserted into the magnetic recording apparatus 100, the platform 2 is moved upward. The upward movement of the platform 2 places the floppy disk at a normal position within the magnetic recording apparatus 100. A spindle motor 3 and a head stack assembly (HSA) 20 are provided on the platform 2.

An electric circuit is formed on a printed circuit board (not shown) supported between the chassis 1 and the platform 2. The electric circuit implements servo processing, internal signal processing, and signal processing for interfaces.

With reference to FIGS. 5–9, the head stack assembly 20 contains magnetic heads 16 and a device for moving the magnetic heads 16. The magnetic-head moving device includes a magnetic-head moving motor formed by a voice coil motor (VCM).

The voice coil motor contains a carriage 14, a VCM coil 13, outer path members 10, inner path members 11, and two magnets 12. The magnetic heads 16 are connected to the carriage 14 via suspensions 15. Specifically, the magnetic heads 16 are supported by the suspensions 15, and the suspensions 15 are connected to the carriage 14. The VCM coil 13 is fixed to a region of the carriage 14 which extends at or near the center of gravity thereof. The magnets 12 are located at positions opposed diagonally with respect to a guide rod 21 extending through a center of the VCM coil 13.

The magnetic recording medium (the magnetic recording media) is sandwiched between the magnetic heads 16 when being placed at its normal position within the magnetic recording apparatus 100. In this case, the magnetic recording medium can be accessed by the magnetic heads 16. In other words, a signal can be written on or read from the magnetic recording medium by the magnetic heads 16.

The magnetic recording medium includes a floppy disk. Specifically, the magnetic recording medium corresponds to a magnetic disk called a cookie and disposed in a floppy disk casing.

Figure 7:
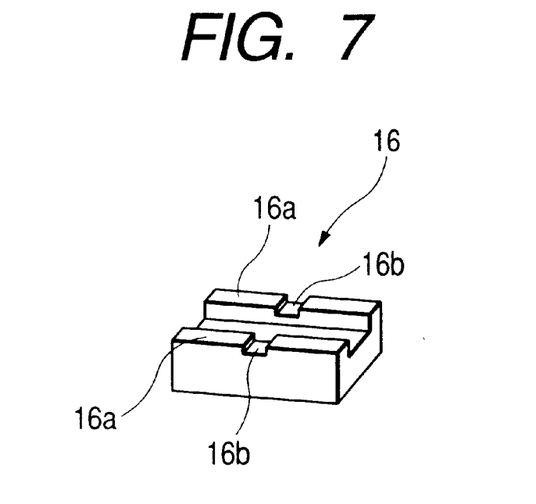
FIG. 7 is a perspective view of a magnetic head in the apparatus of FIG. 4.

With reference to FIG. 7, each magnetic head 16 is of a double MIG ring type. The magnetic head 16 includes a slider made of ceramic, and a core embedded in the slider. Preferably, the slider is of a type called a nano slider. Soft magnetic metal having a high saturated magnetic flux density (Hi-B material) is added to two sides of a gap in the core. The magnetic head 16 has two air bearing surfaces (ABS's) 16a extending in parallel with the direction of movement or rotation of the magnetic recording medium. Cross cuts (grooves) 16b are provided in the air bearing surfaces 16a. The cross cuts 16b extend along a direction perpendicular to the direction of the air bearing surfaces 16a. The cross cuts 16b prevent the magnetic head 16 from being floated relative to the magnetic recording medium by the air bearing effect of the surfaces 16a. Therefore, the magnetic head 16 and the magnetic recording medium can be in stable contact.

Figure 5:
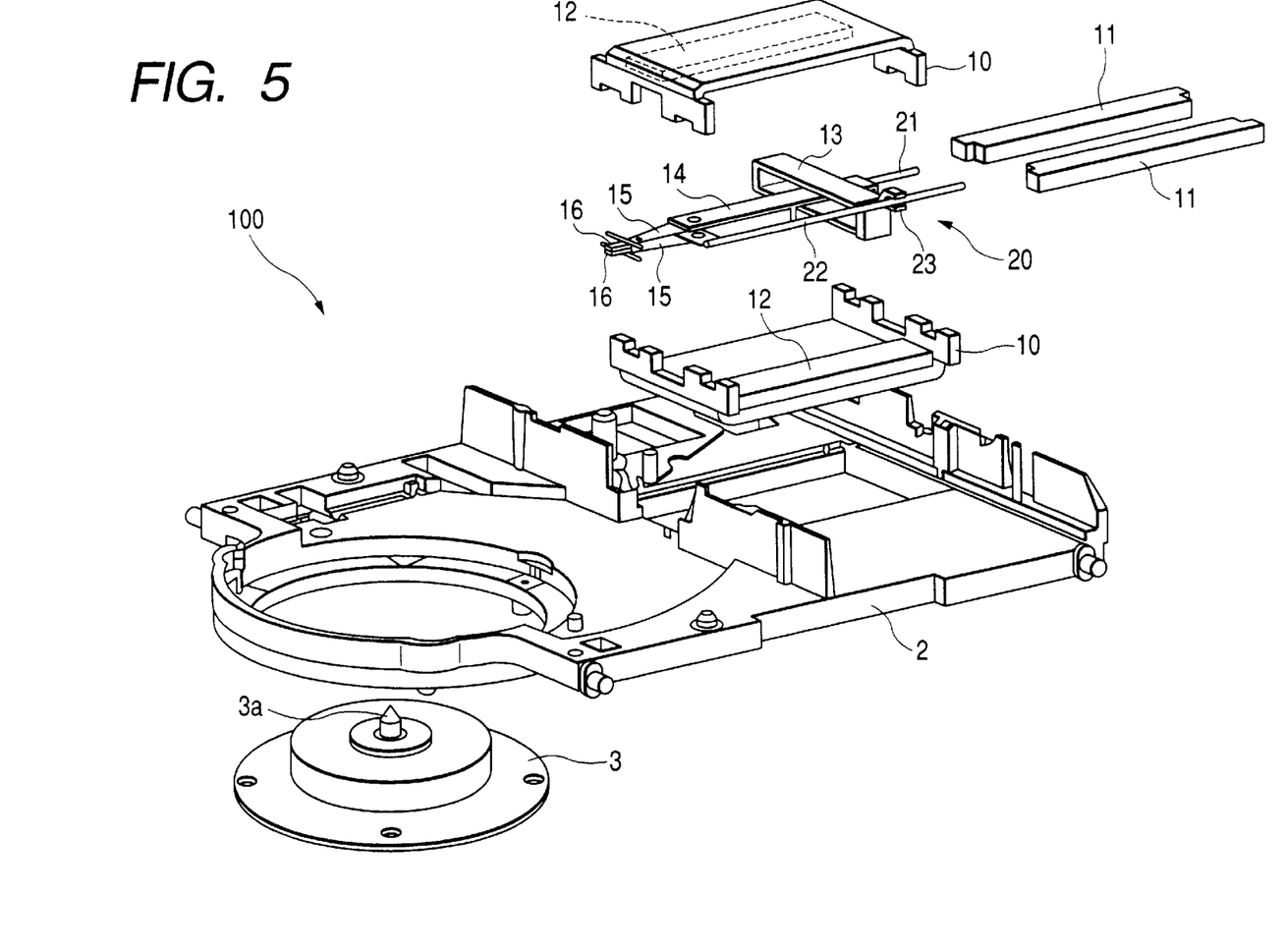
FIG. 5 is an exploded perspective view of the main portion of the apparatus in FIG. 4.
Figure 6:
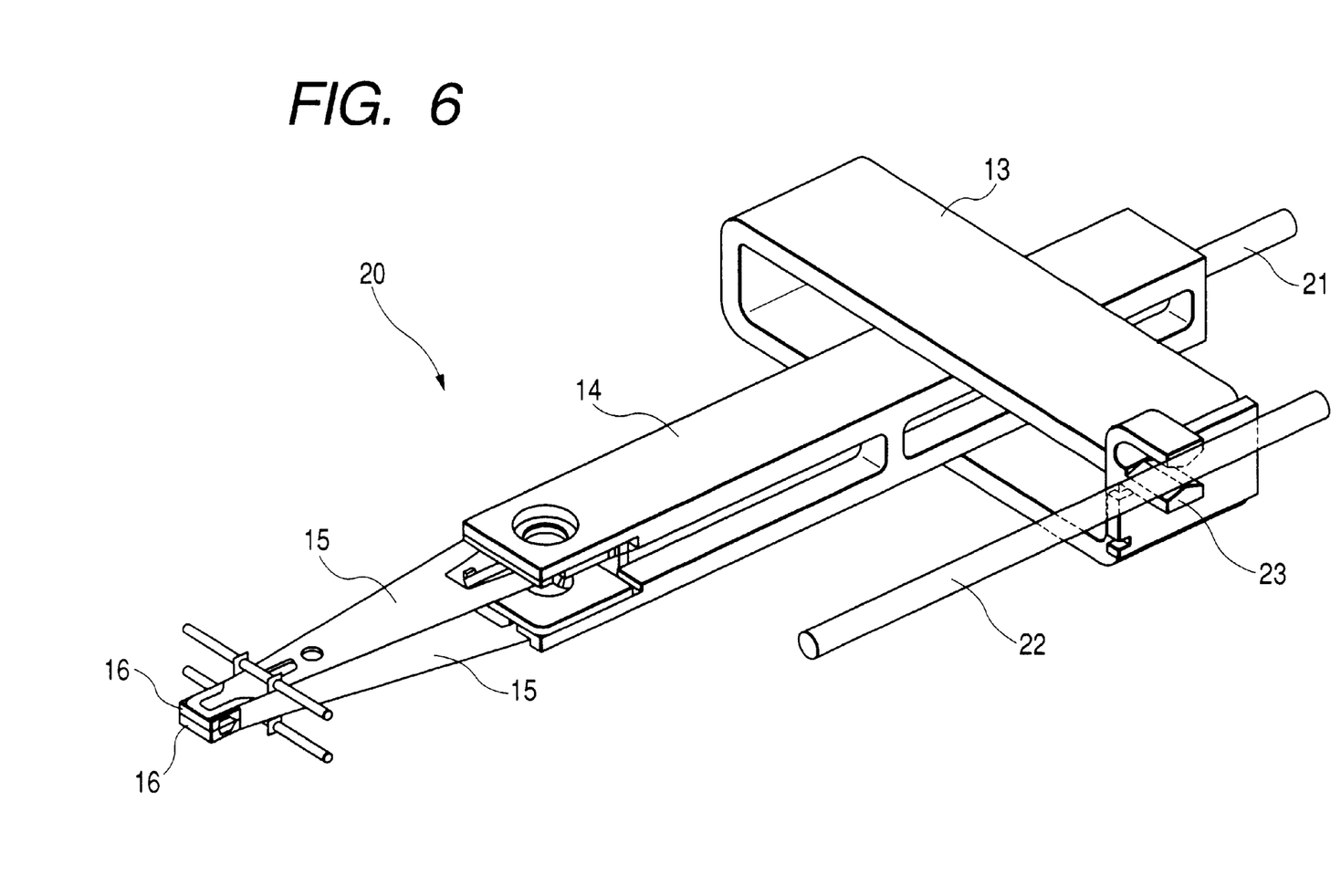
FIG. 6 is a perspective view of a head stack assembly in the apparatus of FIG. 4.
Figure 8:
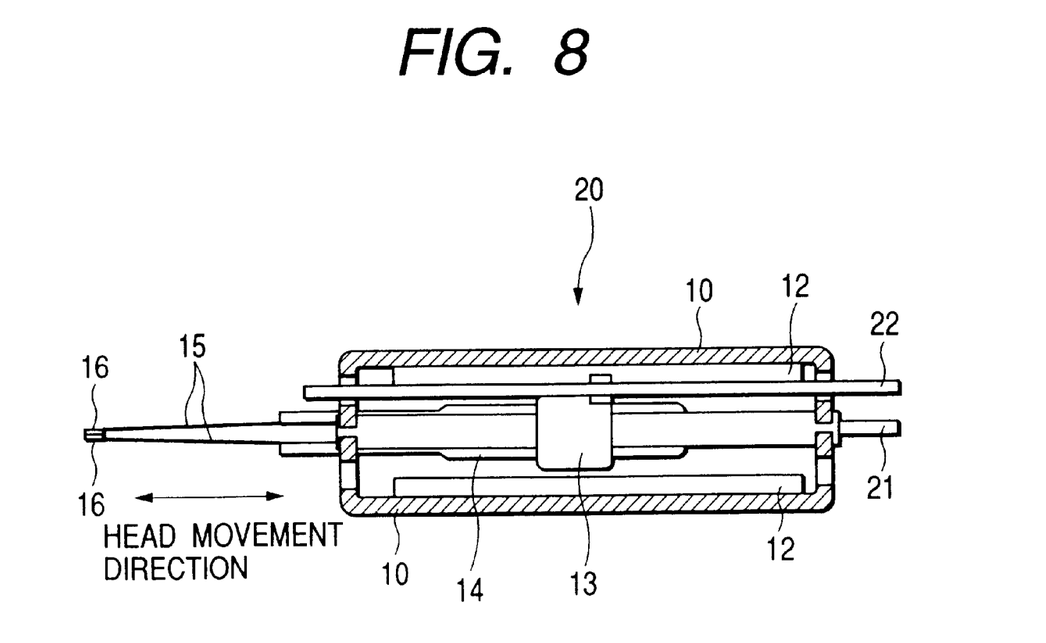
FIG. 8 is a longitudinal section view of the head stack assembly in FIG. 6.

As shown in FIGS. 5, 6, and 8, the suspensions 15 support the magnetic heads 16. The suspensions 15 are designed to provide stable contact between the magnetic heads 26 and the magnetic recording medium. For example, each suspension 15 is formed by etching a thin stainless plate (SUS304). Preferably, each suspension is of a 1950 type.

The carriage 14 is made of aluminum or aluminum-based non-magnetic metal. For example, the carriage 14 is formed by extruding an aluminum piece into a desired shape, and then mechanically processing the extrusion into desired dimensions. During the formation of the carriage 14, treatments such as a heat treatment and a passivity treatment are carried out at suitable stages.

As previously mentioned, the VCM coil 13 is fixed to a region of the carriage 14 which extends at or near the center of gravity thereof. The fixation of the VCM coil 13 to the carriage 14 is executed by using UV adhesive. The VCM coil 13 uses a polyurethane wire of a self bonding type which includes an electrical conductor and a bonding layer (an adhesive layer) made of polyurethane and provided on the electrical conductor. For example, "LOCK Wire" produced by Totoku Electronic Corporation Limited can be used as a wire for the VCM coil 13. The VCM coil 13 is fabricated as follows. A dispenser for application of methanol is located near a winding frame of a winding machine. A polyurethane wire is wound by the winding machine into a coil while the dispenser is activated to implement a bonding process. Thereafter, the whole of the coil is shaped by a former into a desired configuration of the VCM coil 13. During the shaping process, heating may be implemented. Primer may be used in the previously-indicated UV adhesive.

The guide rod 21 extends through the carriage 14 along the longitudinal central axis thereof. The guide rod 21 is centered at the VCM coil 13. The axial direction of the guide rod 21 is equal to a radial direction with respect to the magnetic disk (the magnetic recording medium) which is in its normal position within the magnetic recording apparatus 100. The carriage 14 is slidably supported on the guide rod 21. Accordingly, the carriage 14 can be moved along the guide rod 21 while being guided thereby. In other words, the carriage 14 can be moved radially with respect to the magnetic disk while being guided by the guide rod 21.

Figure 9:
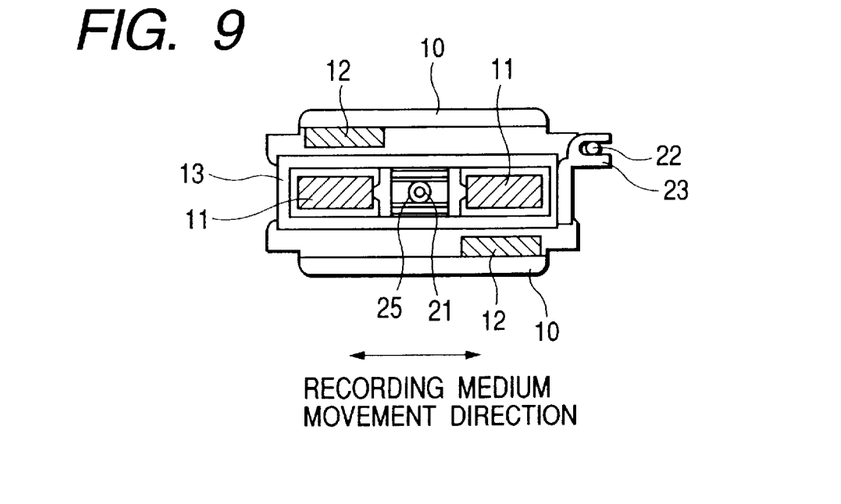
FIG. 9 is a cross-sectional view of the head stack assembly in FIG. 6.

The guide rod 21 is made of stainless steel. The guide rod 21 has an outside diameter of 1 mm. The guide rod 21 is designed to guide the carriage 14 accurately in the radial direction with respect to the magnetic disk. As shown in FIG. 9, a bearing member 25 made of ceramic is provided on a center of the carriage 14. The bearing member 25 surrounds the guide shaft 21. The bearing member 25 is in engagement with the guide rod 21. The bearing member 25 and the guide rod 21 are slightly lubricated with oil. Preferably, the oil has suitable temperature-responsive characteristics, viscosity, and vaporization rate. Preferably, the guide rod 21 is flexible with respect to a driving force generated by the voice coil motor.

A clock rod 22 extends in parallel with the guide rod 21. An outrigger 23 is connected to a side of the block of the VCM coil 13. The outrigger 23 has a recess or groove through which the clock rod 22 extends. The clock rod 22 and the outrigger 23 can be in engagement. The engagement between the clock rod 22 and the outrigger 23 limits or inhibits rotation of the head stack assembly 20 about the axis of the guide rod 21. Under normal conditions, the clock rod 22 and the outrigger 23 are spaced from each other by a clearance or gap of 0.08 mm. The clearance may have a value different from 0.08 mm. The outrigger 23 is made of polycarbonate resin to which PTFE (polytetrafluoroethylene) is added by about 10 wt % for providing a sufficient strength and a low friction.

The magnets 12, the outer path members 10, and the inner path members 11 compose a magnetic circuit. Each inner path member 11 is formed by punching a cold rolled steel plate by a press die, and then galvanizing the punching-resultant piece. The outer path members 10 are made similarly to the inner path members 11.

The magnets 12 are connected to the outer path members 10, respectively. As previously mentioned, the magnets 12 are located at positions opposed diagonally with respect to the guide rod 21. Specifically, the magnets 12 are symmetric with respect to the axis of the guide rod 21. The magnets 12 are made as follows. Material is prepared whose main constituents are neodymium, iron, and boron. The material is shaped into each magnet 12 by compression molding. The magnets 12 have a thickness of 2.1 mm, a width of 7.6 mm, and a length of 39 mm. The magnets 12 have an energy product grade as $(B, H)_{MAX}$=84 KJ/m$^3$. Each of the magnets 12 is a non-oxide rather than an oxide. Each of the magnets 12 is coated with a layer of epoxy resin for preservation to inhibit oxidation.

The magnets 12, the outer path members 10, and the inner path members 11 compose a magnetic circuit provided with a gap in which the VCM coil 13 is located. The voice coil motor is designed to generate a driving force of about 13 G (gravitational acceleration) per ampere fed to the VCM coil 13. Magnetic flux generated by the magnetic circuit crosses the VCM coil 13. The VCM coil 13 can be fed with a driving current from a flexible printed circuit board (FPC). When being energized by the driving current, the VCM coil 13 interacts with the magnets 12 to move the carriage 14 linearly. The magnetic heads 16 move together with the carriage 14. As the carriage 14 moves linearly, the magnetic heads 16 move radially with respect to the magnetic disk (the magnetic recording medium).

Figure 10:
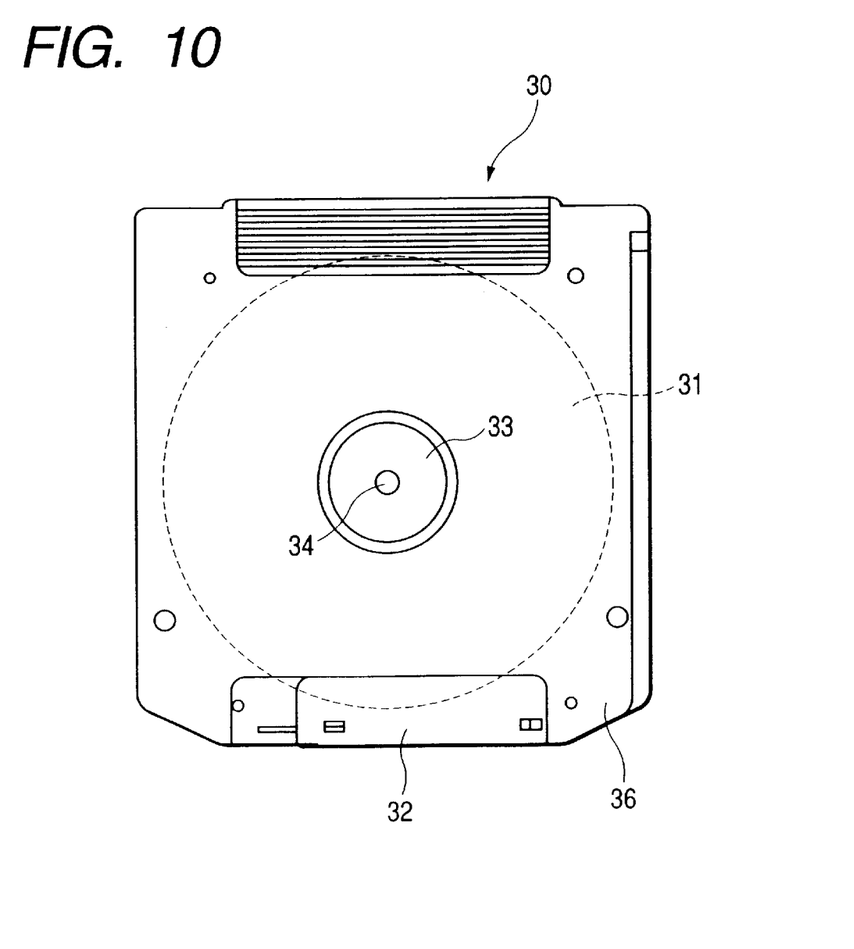
FIG. 10 is a plan view of a floppy disk.

FIG. 10 shows a floppy disk 30 on which the magnetic recording apparatus 100 operates. As shown in FIG. 10, the floppy disk 30 has a casing 36 in which a magnetic recording medium 31 called a cookie is disposed. The magnetic recording medium 31 is a magnetic disk. The casing 36 has an opening for allowing the magnetic heads 16 to access the magnetic recording medium 31. Normally, the head access opening in the casing 36 is closed by a movable shutter 32 provided on the casing 36. As the shutter 32 shifts from its closed position to its open position, the head access opening in the casing 36 is exposed. In the case where the floppy disk 30 is placed at its normal position within the magnetic recording apparatus 100 and the shutter 32 is in its open position, the magnetic heads 16 can be moved into the casing 36 through the head access opening therein. In this case, a signal can be recorded on or read from the magnetic recording medium 31 by the magnetic heads 16. A metal hub 33 is connected to a central portion of the cookie 31. The metal hub 33 is formed by drawing a thin stainless plate. The metal hub 33 is exposed at a central opening in the casing 36. The metal hub 33 has a central hole 34 into which the shaft 3a of the spindle motor 3 can be fitted. The central hole 34 is designed to locate the cookie 31 relative to the spindle shaft 3a. When the spindle shaft 3a fits into the central hole 34 of the metal hub 33, the cookie 31 and the metal hub 33 can be rotated together with the spindle shaft 3a. The cookie 31 includes a PET film whose two sides are provided with magnetic recording layers containing ferrite or pure-iron metal particles as main components.

With reference to FIGS. 8, 9, and 10, a description will be given of the movement of the magnetic heads 16 by the voice coil motor. When a driving current is fed to the VCM coil 13, the VCM coil 13 interacts with the magnets 12 and hence causes a force of driving the carriage 14. The driving current is determined in response to a distance to be traveled, a desired movement direction, and track information recorded on the magnetic recording medium 31. As the distance to be traveled increases, the driving current is increased. The guide rod 21 allows the carriage 14 to be moved by the driving force only in the radial direction with respect to the magnetic disk (the magnetic recording medium) 31. The magnetic heads 16 move together with the carriage 14. Thus, the magnetic heads 16 move radially with respect to the magnetic disk (the magnetic recording medium) 31. Rotation moments on the head stack assembly 20 about the axis of the guide rod 21 cancel each other so that the movement of the heads 16 in the radial direction with respect to the magnetic disk 31 is smooth. Preferably, the movement of the magnetic heads 16 is executed while information of a track position is always monitored and checked. Thus, it is possible to prevent the movement of the magnetic heads 16 from becoming out of control.

As previously mentioned, the magnets 12 are located at positions opposed diagonally with respect to the guide rod 21. This arrangement of the magnets 12 provides accurate travel of the carriage 14 and hence enables the magnetic heads 16 to correctly access the magnetic recording medium 31. Accordingly, errors are prevented from occurring in a signal read from the magnetic recording medium 31 via the magnetic heads 16.

The voice coil motor has only the two magnets 12. The total weight of the magnets 12 is equal to about 60% of that of magnets in a prior-art voice coil motor. Therefore, the voice coil motor having the magnets 12 is relatively light in weight. Furthermore, the voice coil motor having the magnets 12 is relatively low in cost.

The suspensions 15 cause the magnetic heads 16 to apply only a very small load, for example, several gram-forces (gf, to the magnetic recording medium or the cookie 31. Accordingly, the magnetic recording medium 31 and the magnetic heads 16 can be in stable contact. In addition, the magnetic recording medium 31 is enabled to wear at only a low rate. The rotation of the magnetic recording medium 31 relative to the magnetic heads 16 causes a friction-based force (a drag force) of dragging the magnetic heads 16 in the direction of the rotation. An air flow caused by high-speed rotation (about 3,000 rpm) of the magnetic recording medium 31 and a lift caused by the air bearing surfaces 16a of the magnetic heads 16 suppress the drag force to a very small level. Therefore, the guide rod 21 can be prevented from bending or deforming.

What is claimed is:

1. A motor for moving a magnetic head, comprising:
   a carriage;
   a suspension supporting the magnetic head and being connected to the carriage;
   a coil fixed to the carriage;
   a guide rod centered at the coil; and
   a magnet arrangement consisting of only two magnets located at positions opposed diagonally with respect to the guide rod.

2. A motor as recited in claim 1, wherein the carriage is made of material containing aluminum.

3. A motor as recited in claim 1, wherein the magnets are made by compression molding.

4. A motor as recited in claim 3, wherein the magnets include a non-oxide and an oxidation inhibitor.

5. A magnetic recording apparatus comprising a magnetic head, and a motor for moving the magnetic head, wherein the motor comprises 1) a carriage, 2) a suspension supporting the magnetic head and being connected to the carriage, 3) a coil fixed to the carriage, 4) a guide rod centered at the coil, and 5) a magnet arrangement consisting of only two magnets located at positions opposed diagonally with respect to the guide rod.

6. A magnetic recording apparatus as recited in claim 5, wherein the guide rod is flexible with respect to a driving force caused by the motor.

7. A magnetic recording apparatus as recited in claim 5, wherein the coil comprises a self bonding wire.

8. A magnetic recording apparatus as recited in claim 7, wherein the self bonding wire comprises an electrical conductor and a bonding layer made of polyurethane and provided on the electrical conductor.

9. A magnetic recording apparatus as recited in claim 8, further comprising a UV adhesive bonding the coil and the carriage together.

10. A magnetic recording apparatus as recited in claim 5, further comprising means for preventing the guide rod from being bent by a friction force caused between the magnetic head and a magnetic recording medium.

* * * * *

UNITED STATES PATENT AND TRADEMARK OFFICE
CERTIFICATE OF CORRECTION

PATENT NO. : 6,510,028 B1
DATED : January 21, 2003
INVENTOR(S) : Hitoshi Watanabe et al.

It is certified that error appears in the above-identified patent and that said Letters Patent is hereby corrected as shown below:

<u>Title page, Item [54] and Column 1, lines 1 and 2,</u>
Title, change "MAGNETIC HEAD MOVING MOTOR AND MAGNETIC RECORDING APPARATUS" to -- MAGNETIC HEAD MOVING MOTOR HAVING A GUIDE ROD CENTERED AT THE DRIVING COIL WITH DRIVING MAGNETS ARRANGED DIAGONALLY WITH RESPECT TO THE GUIDE ROD --

Signed and Sealed this

Twenty-sixth Day of August, 2003

JAMES E. ROGAN
*Director of the United States Patent and Trademark Office*